United States Patent
Maly et al.

(10) Patent No.: US 7,219,345 B2
(45) Date of Patent: May 15, 2007

(54) SYSTEM AND METHOD FOR TERMINATING PROCESSES IN A DISTRIBUTED COMPUTING SYSTEM

(75) Inventors: John W. Maly, LaPorte, CO (US); Ryan C. Thompson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 761 days.

(21) Appl. No.: 10/322,221

(22) Filed: Dec. 17, 2002

(65) Prior Publication Data

US 2004/0117792 A1    Jun. 17, 2004

(51) Int. Cl.
*G06F 9/44* (2006.01)
*G06F 9/48* (2006.01)

(52) U.S. Cl. ............ 718/101; 718/102; 719/314; 719/313; 719/320; 715/740; 709/223

(58) Field of Classification Search ........ 718/1, 718/100–108; 709/223–226; 719/310–332; 715/740

See application file for complete search history.

(56) References Cited

U.S. PATENT DOCUMENTS

| | | | | | |
|---|---|---|---|---|---|
| 5,432,932 | A | * | 7/1995 | Chen et al. ........... | 718/103 |
| 5,801,690 | A | * | 9/1998 | Ayoub et al. .......... | 715/755 |
| 5,872,970 | A | * | 2/1999 | Pickett et al. ......... | 718/101 |
| 6,442,436 | B1 | * | 8/2002 | Nogami ............... | 700/19 |
| 6,961,937 | B2 | * | 11/2005 | Avvari et al. .......... | 718/104 |
| 2002/0078130 | A1 | * | 6/2002 | Thornton et al. ....... | 709/201 |
| 2004/0015975 | A1 | * | 1/2004 | Nandigama et al. ..... | 718/104 |
| 2004/0040024 | A1 | * | 2/2004 | Green et al. .......... | 718/100 |

FOREIGN PATENT DOCUMENTS

WO    WO 00/38033    *    6/2000

OTHER PUBLICATIONS

Kaplan, Joseph et al. "A Comparison of Queueing Cluster and Distributed Computing Systems." Jun. 1994.*
Kalvalegen, Erwin. "Games/Oraqueue: A queueing batch system for GAMS jobs in an Oracle environment." Mar. 5, 2002.*
Sun Microsystem. "Resource Management." Jul. 1999.*
SQMS: A Batch Scheduling System for Large PC Cluster, Somsak Sriprayoonskul and Putchong Uthayopas, Parallel Research Group, CONSYL, Department of Computer Engineering, Faculty of Engineering, Kasetsart University, Bangkok, Thailand, pp. 1-9.
OpenPBS and PBS Pro Feature Comparison, http://www.openpbs.org/product_comparison.html Oct. 8, 2002, pp. 1-3.

* cited by examiner

*Primary Examiner*—Lewis A. Bullock, Jr.
(74) *Attorney, Agent, or Firm*—Leslie P. Gehman

(57) ABSTRACT

A system is provided for terminating processes that are executing on a plurality of distributed computing nodes. The system comprises a batch queuing system configured to receive jobs from a user and to dispatch jobs to the distributed computing nodes. A process shutdown interface is included that is configured to receive task criteria for terminating processes corresponding to the task criteria on the distributed computing nodes. An automatic process shutdown module is in communication with the process shutdown interface. The automatic process shutdown module is configured to retrieve information based on the task criteria from the batch queuing system regarding the processing location of jobs submitted to the batch queuing system. The automatic process shutdown module is also configured to terminate the processes on the computing nodes for jobs that are identified using the information obtained from the batch queuing system.

26 Claims, 4 Drawing Sheets

SYSTEM AND METHOD FOR TERMINATING PROCESSES IN A DISTRIBUTED COMPUTING SYSTEM

FIELD OF THE INVENTION

The present invention relates generally to processes in a distributed computing system.

BACKGROUND

A collection of computers connected by an electronic network and the appropriate software can be used as a single computing system. In network-based computing, a computing resource is not necessarily tied to a single machine. Rather, it becomes a feature of the whole network-based computer. A network-based computer can exist in a number of contexts, such as in a heterogeneous collection of user workstations and server machines on a local area network. A special purpose cluster of machines with individual processors connected by a high-speed network can also be a computing resource, or an enterprise or global network connecting several such environments together can also be considered a single computing resource.

This model can create a high performance computing platform that includes a set of workstations, processors, or PCs connected together by a high-speed network such as Fast Ethernet, Gigabit Ethernet, or Myrinet. Each processor or computer in the system is usually called a node. One node in the system can act as a front-end node that controls system operation. Other nodes in the system are called computing nodes, and their function is to perform the computation. Each node can run a full-multitasking operating system (e.g., Linux, UNIX, etc.) and each user can login to any node to work. A single system view is achieved by a shared file system such as NFS (Network File System) and a shared information system like NIS (Network Information System). Many systems have parallel computing software library like PVM (Parallel Virtual Machine) or MPI (Message Passing Interface) installed to form a network computing system.

One component such environments usually utilize is a resource management system or batch scheduling system. This tool helps users effectively apply high performance computing systems to their computing needs. Such a system generally has the capability of locating, scheduling, allocating and delivering resources or services while respecting policy requirements for load-balancing, fair-share scheduling, and optimal usage of resources. Batch scheduling systems have been used in many organizations to obtain super computing power at an affordable cost.

If a user does not have a good batch scheduling program then the user will have to know the details of the computing system in order to run across multiple nodes in their cluster transparently. This resource allocation can be configured in a way so that the resource utilization is optimal.

Many implementations of batch scheduling systems have become available. Some of these include PBS from NASA, NQS as modified from PBS by several commercial groups, IDS's Resource Manager, and HP's Task Broker. These approaches solve similar problems and choose either a centralized or a decentralized approach. Many of the centralized approaches do not provide a significant amount of fault-tolerance or flexibility. Decentralized scheduling can be used in the local domain even though a centralized approach is likely to scale better.

In a cluster processing system, batch scheduling has many important roles. First, the batch scheduling system helps users manage their job submissions. Second, the batch system controls the distribution and allocation of system resources such as the allocation of computing nodes to each user's task to maximize the performance and optimize resource usage. Third, the system controls the cluster system functions according to certain system policy. For example, some systems may restrict memory and disk usage for each user depending on their priority.

SUMMARY OF THE INVENTION

The invention provides a system for terminating processes that are executing on a plurality of distributed computing nodes. The system comprises a batch queuing system configured to receive jobs from a user and to dispatch jobs to the distributed computing nodes. A process shutdown interface is included that is configured to receive task criteria for terminating processes corresponding to the task criteria on the distributed computing nodes. An automatic process shutdown module is in communication with the process shutdown interface. The automatic process shutdown module is configured to retrieve information based on the task criteria from the batch queuing system regarding the processing location of jobs submitted to the batch queuing system. The automatic process shutdown module is also configured to terminate the processes on the computing nodes for jobs that are identified using the information obtained from the batch queuing system.

DETAILED DESCRIPTION

Figure 1:
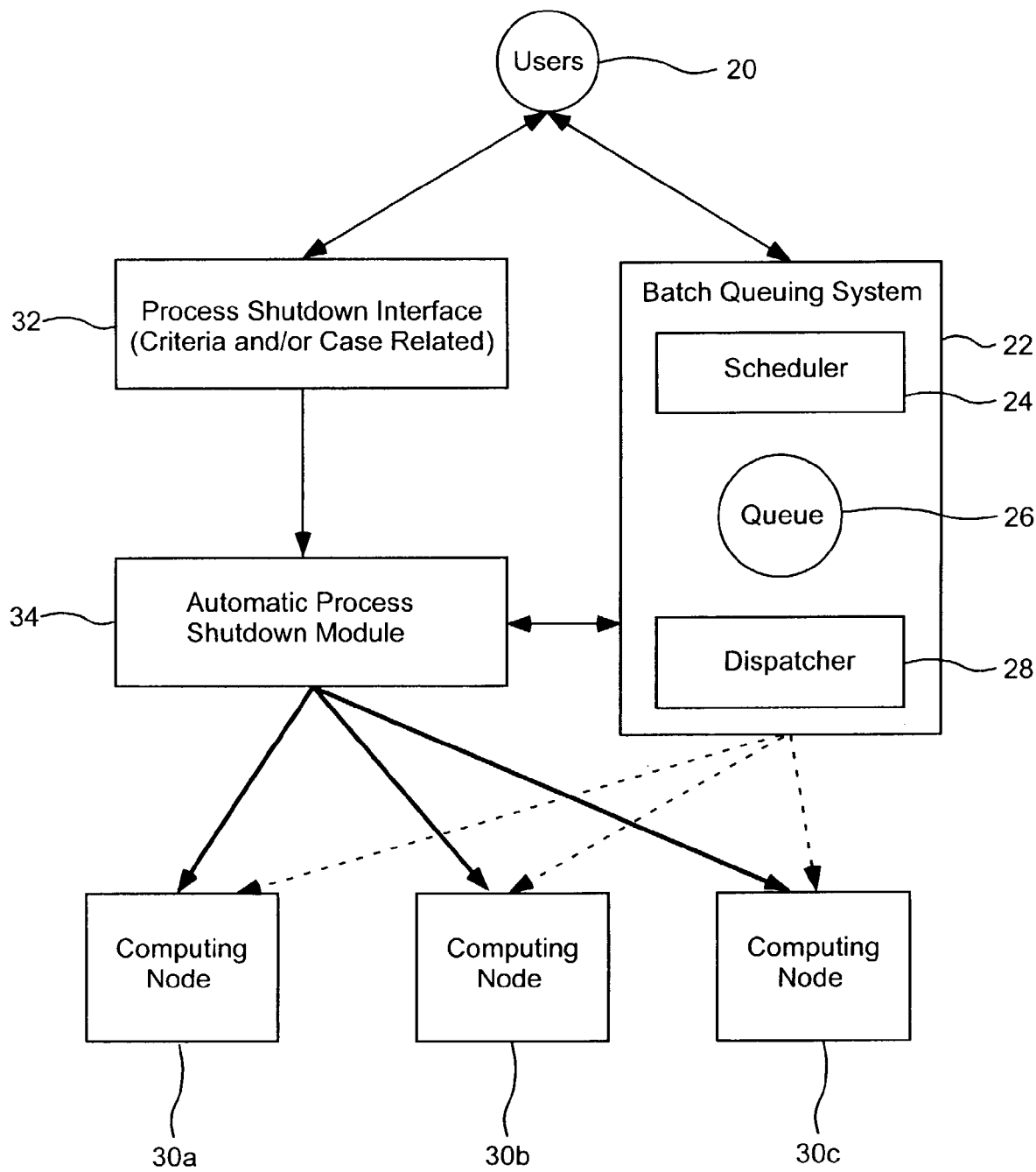
FIG. 1 is a block diagram illustrating a system for terminating processes in a batch queuing system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

One of the drawbacks of using a batch queuing or batch scheduling system is that when a user desires to terminate a job or group of jobs, then the user must submit each of those jobs back to the scheduler for termination. Unfortunately, these termination jobs will be queued behind other jobs or requests that have already been made to the batch queuing system. This can result in a significant amount of delay before the requested batches or jobs will be deleted from the batch queue and from their respective computing nodes. Accordingly, it can take a relatively long period of time to terminate the jobs, even if the user immediately knows the jobs are having problems, have become obsolete, or are unnecessary.

It is also time consuming for the user to have to submit a large number of requests to the batch scheduling system. This is especially true where a group of jobs must be terminated because they are related.

Another drawback with using a centralized batch queuing system is that the batch queuing system is not necessarily reliable. Since users submit their jobs to the batch queuing system, when there is a problem with the batch queuing system, then no new jobs or job terminations can be requested. The batch queuing system can also create a bottleneck where a large number of jobs have been submitted to the queuing system and these jobs are taking a significant amount of time to process through the scheduling queue and dispatcher.

Another similar situation is where the scheduler in the batch queuing system fails and is unable to process any further requests. In other words, the scheduler can become hung up. In this situation, it is difficult to stop processes that are executing on computing nodes without rebooting the batch queuing system. During the time the batch queuing system is rebooting, the processes that are running on the computing nodes will be consuming computing resources. Such processes will consume computing power even if they are unwanted or have crashed.

The present invention, as illustrated in FIG. 1, provides a system and method for terminating processes that are executing on a plurality of distributed computing nodes 30a, 30b, 30c in a network computing environment. Specifically, this invention allows a user to terminate jobs by task criteria such as test case name, application name, or start time range. For example, computing applications that can have associated task criteria are hardware verification test cases, software test cases, environmental simulations (e.g. weather simulations), scientific simulations (e.g. physics and nuclear simulations), computer graphics rendering, artificial intelligence "starting play books", and similar compute intensive applications. The present invention provides a relatively fast and powerful system for termination of processes on distributed computing nodes using minimal criteria. In addition, this system and method provides a back-up channel for terminating groups of processes running on the distributed computing nodes.

The system comprises a batch queuing system 22 that is configured to receive job requests from one or more users 20. The batch queuing system has a scheduler 24 to service job requests and determine the execution sequence for jobs submitted to the batch queuing system. Once jobs have been scheduled, they are entered into a queue 26 and the job details can be saved to a spool directory. The queue contains information about the jobs and when the jobs will be processed. Once the jobs are in the queue they can be dispatched by the dispatcher 28 when the appropriate computing resources are available. The dispatcher can send the jobs to the computing nodes when they are able to receive them based on load balancing decisions. The results from the processes on the computing nodes will also be collected by the dispatcher so they can be returned to the user.

A process shutdown interface 32 is configured to receive task criteria or other high level criteria for terminating jobs and processes corresponding to the task criteria. The process shutdown interface can be a command line interface, or it can also be a graphical user interface (GUI) that allows the user to enter text criteria and/or select certain task options. The task criteria can be entered by a user directly into the process shutdown interface on a front end node that controls system operation or task criteria can be sent to the system via a remote communication.

An automatic process shutdown module 34 is in communication with the process shutdown interface 32. Alternatively, the process shutdown module and shutdown interface can be combined into the same logical or physical unit. The automatic process shutdown module is configured to retrieve information from the batch queuing system regarding the execution location of jobs submitted to various nodes on the batch queuing system. Information can be queried from the scheduling queue's contents using the user's criteria and the retrieved information can be used to track down even more specific information. For example, test case names can be retrieved from the queue and then the system can identify the jobs for test cases that have been selected. Then the job names or numbers can be used to retrieve process names from the relevant computing nodes. In addition, the executing test case names can be returned to the process shutdown interface and the user can select the test case(s) that the user wants to terminate.

The task criteria or name criteria can be used to filter the information that is retrieved for jobs from the batch queuing system to create a list. This filtered job list is used by the automatic process shutdown module 34 to terminate the processes on the computing nodes 30a, 30b, 30c that are identified using the information obtained from the batch queuing system.

As discussed previously, a computing node can be a computer workstation, a personal computer or some other computing device that is networked together with the other nodes. These nodes can be networked together using a LAN, WAN or other high speed networking equipment that allows the nodes to communicate.

The task criteria that will be received by the automatic process shutdown interface can include a task name. Specifically, users can terminate a group of processes and jobs based on a specific task name submitted by a user. The task name can be a test case name, an application case name, or more specific criteria such as time-based criteria. The task criteria are linked to the jobs for that task and the specific jobs help identify the processes that can be terminated on the individual computing nodes. The use of the word criteria in this disclosure is also defined to include the entry of a single criterion or task name.

One method of creating a user job list requests job information from the batch scheduling queue. As discussed, this is an effective way to identify jobs that correspond to a specific task criteria. Alternatively, the job list for a specific task may have been transmitted from the batch scheduling queue to the automatic process shutdown module at an earlier point in time.

In one embodiment, the jobs-to-task mapping can be stored in the batch queuing system. Alternatively, this mapping can be stored in the automatic process shutdown module. This way when a task is requested to be shutdown, the automatic process shutdown module will know the specific jobs that have been linked to the requested task and then those jobs can be looked up in the batch queuing system. In another alternative embodiment, the batch queuing system can provide the information for identified processes (corresponding to the job) to the automatic shutdown module.

In order for the automatic process shutdown module to receive the information as to which computing nodes are executing specific processes, the automatic shutdown module can connect to the respective computing nodes. The connection to the computing nodes can be performed using the automatic system authentication for the user who is requesting that a task be shutdown. The automatic system authentication typically provides an encrypted communication session to remote computing nodes. This communication can be performed using scripting, automated telnet sessions, or remote shells to set up valid user configurations and rights. An example of a computing protocol that can be used in the present invention for connecting to a remote system is secure shell (SSH), which provides encrypted or secure connections.

This invention provides the useful result that a user is able to shutdown all corresponding jobs and processes for a specific task criteria. This saves a significant amount of time for a user in terminating jobs. It also prevents the user from having to know what jobs were sent to the batch queuing system for a specific task.

The present system and method avoids the time that is involved for the batch queuing system to process the specific shutdown jobs through the scheduler. As a result, this provides a speedy route for terminating processes corresponding to specific task criteria. Since processes can be terminated while avoiding the batch queuing system, this can bypass a scheduler that has crashed. This additional termination route can also avoid other problems within the batch queuing system that might slow down or prevent process shutdown. There may be situations where the batch queuing system has crashed and the processes running on computing nodes are consuming resources within the entire system. The present invention allows a user to terminate the processes running on computing nodes even when the batch queuing scheduler and dispatcher are not operating properly. The additional termination route can also take some of the processing load off of the batch queuing system.

In one embodiment of the invention, the automatic processes shutdown module can request and store information corresponding to task criteria each time a task and its specific jobs are submitted to the batch queuing system. Then, even if the batch queuing system is entirely disabled, the automatic process shutdown module can shutdown tasks based on criteria submitted. This allows the entire computing system to recover from problems with the batch queuing system, while the batch queuing system is disabled or being rebooted.

Figure 2:
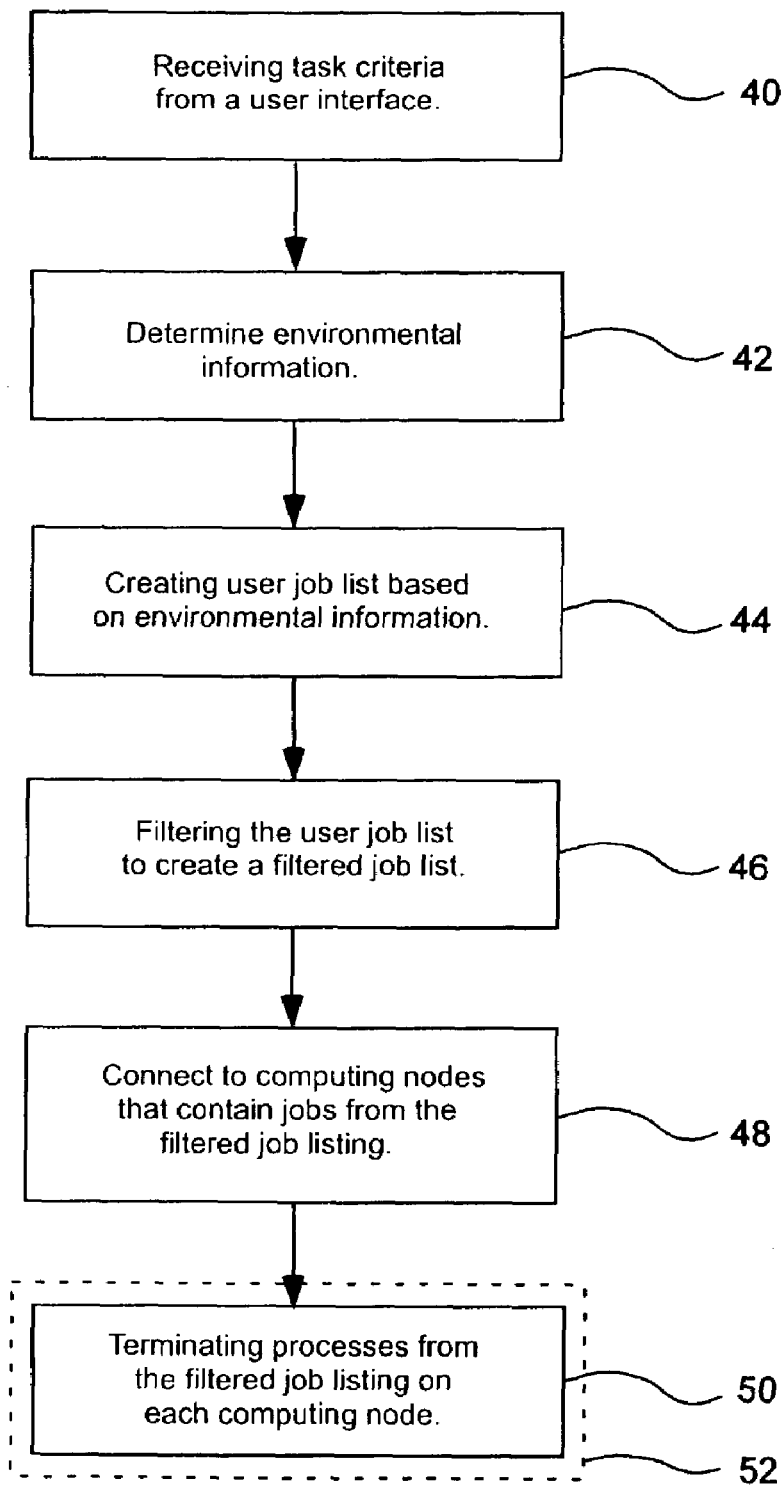
FIG. 2 is a flow chart depicting a method for terminating processes in a batch queuing system in an embodiment of the present invention.

FIG. 2 illustrates a method for terminating related processes that are executing on a distributed computing system with a plurality of computing nodes. The method includes the step of receiving task criteria from a user interface for terminating related processes in block 40. Another step is determining environmental information for a user in the distributed computing system in block 42. This means the automatic process shutdown module or the process shutdown interface can query the automatic login and networking software to determine a user's rights, permissions, passwords, and environment variables in the distributed computing system. Once this environmental information has been received, it can be used to retrieve information from the batch queuing system and to connect to computing nodes.

A further step is creating a user job list based on the corresponding environment information for a user in block 44. The user job list will be created using information retrieved from the batch queue and the batch queuing system. In other words, a list of user jobs that are currently running and that are being processed for a user can be created. Next, the user job list is filtered to create a filtered job list which includes jobs that match the task criteria provided by the user in block 46.

At this point, the system has a list of all the jobs that have been identified as belonging to a specific task criteria provided by a user. The system then connects to the computing nodes that are executing processes from the filtered job list in block 48. These connections can be made using the user's ID and permissions obtained from the network system. Once the system of the present invention is connected to the specific computing node, the system performs the step of terminating processes from the filtered job list on each computing node in block 50. The further details of this step on each computing node 52 will be described below.

Figure 3:
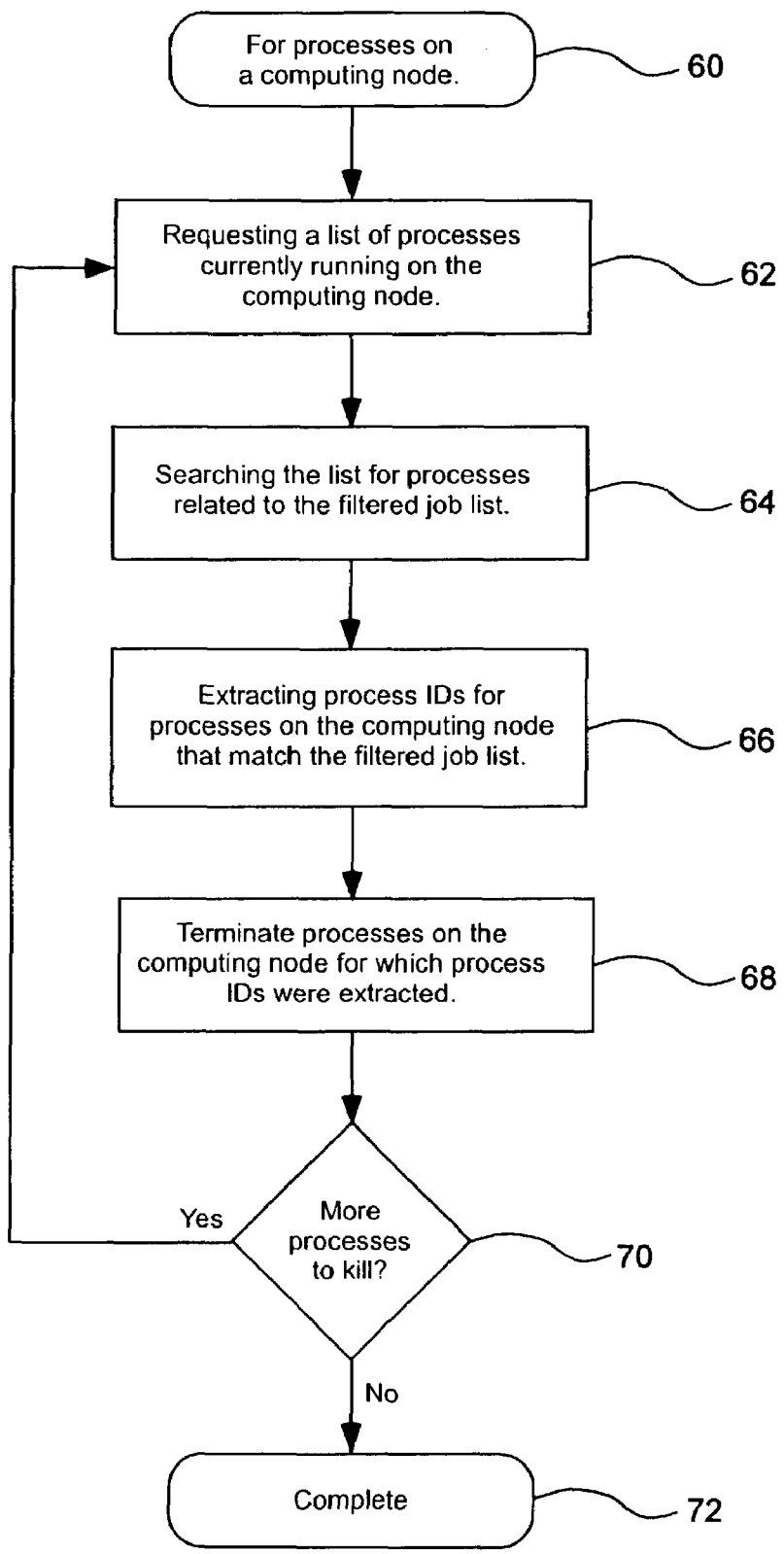
FIG. 3 is a flow chart illustrating a more detailed method of terminating processes on each computing node as in FIG. 2.

FIG. 3 illustrates an embodiment of a method for terminating a process on an individual computing node in block 60. (See block 52 in FIG. 2.) This process is illustrative of a logical implementation of this termination process but it is not necessarily an actual implementation. Initially, the automatic process shutdown module can request a list of processes currently running on the computing node in block 62. This list includes very specific information about the process such as the process ID and other attributes of the process as it is executing on the computing node. The present invention can search the process list from the computing node for processes related to the filtered job list in block 64. In other words, for each job that was identified by the automatic process shutdown module, the system will be able to identify which relevant processes from the filtered job list are on that computing node.

When a match is found, the automatic process shutdown module will extract the process ID for each process on the computing node that is associated with the filtered job list, as in block 66. Then the system will terminate the processes on the computing node for which the process IDs were previously extracted in block 68. At this point, these steps will be repeated for each process that needs to be terminated on the computing node, as decided in block 70. Eventually, all the processes on the specific computing node will be terminated and the procedure will be completed for that computing node in block 72.

This termination procedure can be repeated for each computing node that has processes from the task criteria or distributed system running on it. In one embodiment of the invention, when the system requests a list of processes currently running on the computing node, the user's ID and environmental information can be used to request only processes that are allocated to that specific user or correspond to specific environmental criteria. This way the system will not examine every process running on each computing node but will just examine processes that are owned by the user or processes that meet other environmental criteria that are pre-determined. For example, a request can be made for all processes belonging to a specific user to be terminated. This is a streamlined way for a user to shutdown every job or process they have started.

Figure 4:
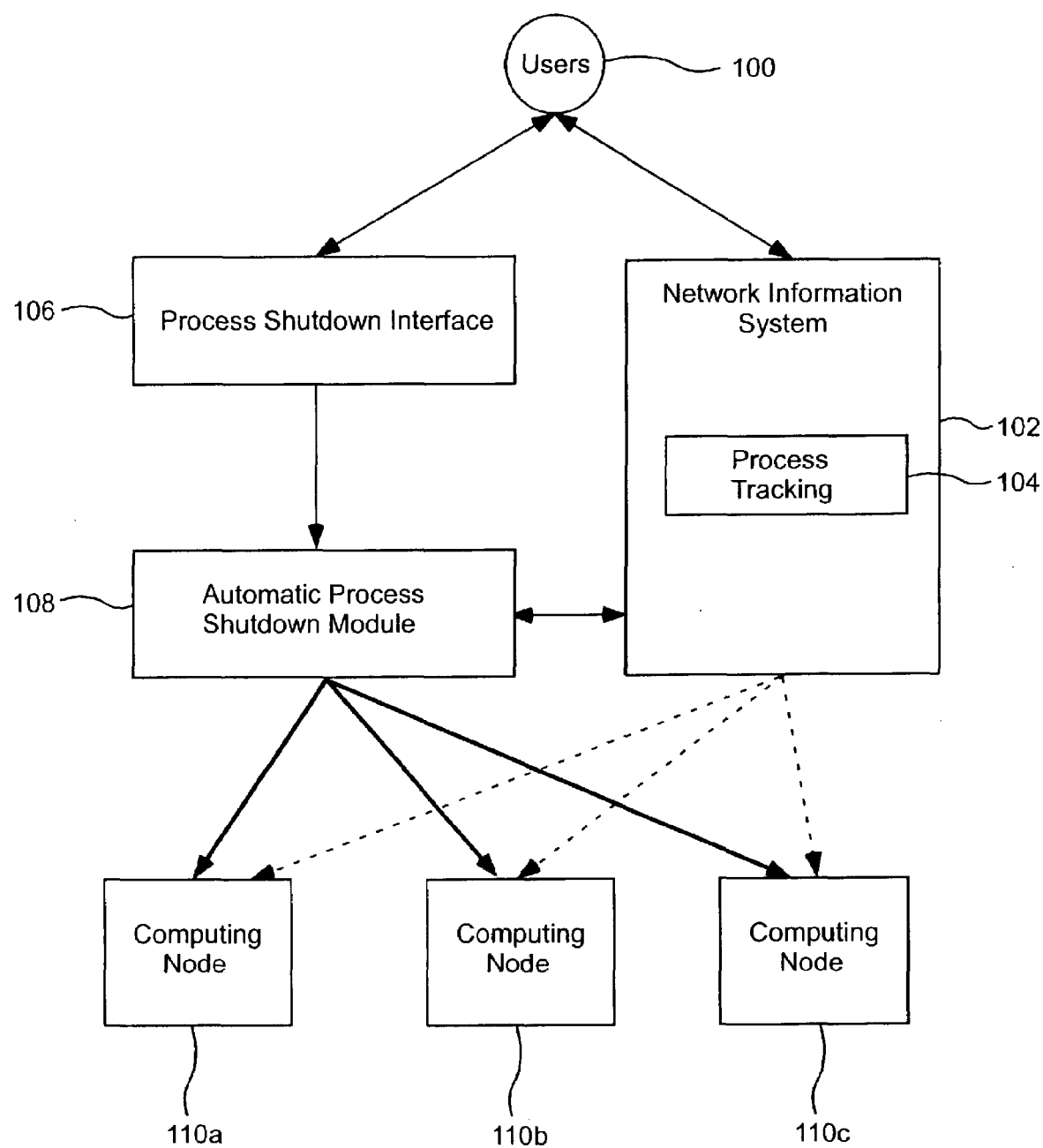
FIG. 4 is a block diagram illustrating a system for terminating processes in a cluster processing system in accordance with an embodiment of the present invention.

Another embodiment of the invention can be used in a system that contains a plurality of distributed computing nodes which do not have a batch queuing system. FIG. 4 illustrates such a system for terminating processes in a distributed computing environment. This system includes a shared file and information system 102 that controls the interaction and information passing between the computing nodes 110a, 110b, 110c. Users 100 are able to submit processes or jobs to the process tracking module 104. The process tracking module then sends these processes or jobs to the computing nodes. The process tracking module in the shared file and information system is configured to track the location of the executing processes. This means that no batch scheduling or specific balancing algorithms are applied to the system but users can still submit processes to the shared file information system which allocates the processes to computing nodes.

A process shutdown interface 106 is also configured to receive task criteria for terminating jobs corresponding to the task criteria. As described before, the process shutdown interface will collect information corresponding to specific criteria such as case names, application names, test names, or other specific criteria with which the user desires to terminate a group of jobs. The criteria from the process shutdown interface can be transmitted to the automatic shutdown module 108. The automatic shutdown process module is configured to receive information from the process tracking module regarding the jobs' or processes' computing node location. The automatic shutdown process module requests this information from the shared file and information system 102 and the process tracking module 104 based on the task criteria received from users. The processes that need to be terminated are identified based on the information received from the process tracking module which identifies job or process locations on a specific computing nodes.

Configuring this system to terminate processes provides the advantage of a redundant backup system that can be used for terminating processes. Even if the shared file and information system has crashed or failed, the automatic process shutdown module can still receive the task criteria from the automatic process shutdown interface and terminate the processes on the computing nodes. This specific scenario also presupposes that the automatic process shutdown module will still have access to the specific process information needed to shutdown the computing nodes even if the shared file and information system has crashed. Either the automatic process module can access the files used by the shared file information system, or the information about job or process locations can be transferred to the automatic shutdown module as the processes are submitted to the process tracking module.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A system for terminating processes that are executing on a plurality of distributed computing nodes, comprising:
   a batch queuing system configured to receive jobs from a user and to dispatch jobs to the distributed computing nodes;
   a process shutdown interface, configured to receive task criteria for terminating jobs corresponding to the task criteria on the distributed computing nodes; and
   an automatic process shutdown module, in communication with the process shutdown interface, configured to receive the task criteria for terminating jobs from the process shutdown interface and to retrieve information based on the task criteria from the batch queuing system regarding a processing location of jobs submitted to the batch queuing system, and configured to terminate the processes on the computing nodes independent of the batch queuing system for jobs that are identified using the information obtained from the batch queuing system.

2. A system as in claim 1, wherein the task criteria include a task name which defines the jobs to be terminated on computing nodes.

3. A system as in claim 1, wherein the task criteria further comprises a test case name which includes at least one job submitted to the batch queuing system.

4. A system as in claim 1, further comprising a scheduler in the batch queuing system to schedule jobs submitted to the batch queuing system by users.

5. A system as in claim 1, further comprising a batch queue in the batch queuing system to store jobs submitted to the batch queuing system in a scheduled order.

6. A system as in claim 5, wherein the information for identifying jobs to be terminated is retrieved from the batch queue.

7. A system as in claim 1, farther comprising a dispatcher in the batch queuing system to assign the jobs in a batch to computing nodes.

8. A system as in claim 1, wherein the process shutdown interface further comprises a graphical user interface through which a user can enter task name criteria.

9. A method for terminating related processes that are executing on a distributed computing system having a plurality of computing nodes, comprising the steps of:
   receiving task criteria from a user interface for terminating related processes;
   determining environmental information for a user in the distributed computing system;
   creating a user job list based on corresponding environmental information for a user and information retrieved from a batch queue in a batch queuing system based on the task criteria received; and
   filtering the user job list to create a filtered job list which includes jobs that match the task criteria provided by the user;
   connecting to computing nodes that are executing processes from the filtered job list; and
   terminating processes from the filtered job listing on computing nodes independent of the batch queuing system.

10. A method as in claim 9, wherein the step of determining environmental information farther comprises the step of determining a user ID for the user.

11. A method as in claim 9, wherein the step of determining environmental information farther comprises the step of determining remote permissions on computing nodes for the user.

12. A method as in claim 9, wherein the step of creating a user job list further comprises the step of creating a user job list by requesting job information from the batch scheduling queue.

13. A method as in claim 9, wherein the step of creating a user job list further comprises the step of creating a user job list which includes jobs which match a user name and are in a running state.

14. A method as in claim 9, wherein the step of filtering the user job list further comprises the step of filtering the job list to identify jobs that need to be terminated.

15. A method as in claim 9, further comprising the step of identifying computing nodes that have executing processes associated with the filtered job list.

16. A method as in claim 9, wherein the step of terminating processes from the filtered job listing on each computing node, further comprises the steps of:

searching each relevant computing node for processes associated with the filtered job list;

extracting the process IDs for processes associated with the filtered job list; and terminating the processes using the process IDs that were extracted.

17. A method as in claim 16, wherein the step of searching each relevant computing node further comprises the step of requesting a list of processes currently running on the computing node.

18. A method for identifying and terminating related processes that are executing on a plurality of distributed computing nodes, comprising the steps of:

receiving task specific criteria from a user for jobs the user desires to terminate;

creating a job list that matches the task specific criteria using job data stored in a batch queuing system;

connecting to computing nodes that contain processes matching the job list;

searching each computing node for processes in the job list;

extracting the process IDs for processes in the job list;

terminating the processes using the extracted process IDs independent of the batch queuing system.

19. A method as in claim 18, wherein the step of searching each computing node further comprises the step of requesting a list of processes currently running in each computing node.

20. A method as in claim 18, wherein the step of creating a list of jobs further comprises the step of receiving job information corresponding to the task criteria from a batch queue.

21. A method as in claim 18, wherein the step of creating a list of jobs further comprises the step of determining environmental information for a user in the distributed computing system.

22. A method in accordance with claim 21, further comprising the step of determining the user ID for a user.

23. A method in accordance with claim 21, further comprising the step of determining remote permissions on computing nodes for a user.

24. A system for terminating processes that are executing on a plurality of distributed computing nodes, comprising:

a network information system configured to receive processes from a user and to initiate processes on the distributed computing nodes; via a batch queuing system a process tracking module in the network information system configured to track a location of executing processes; distributed by the batch queuing system a process shutdown interface, configured to receive task criteria for terminating jobs corresponding to the task criteria on the distributed computing nodes; and an automatic process shutdown module, in communication with the process shutdown interface, configured to receive task criteria for terminating jobs from the process shutdown interface and to retrieve information based on the task criteria from the process tracking module regarding the location of executing processes submitted to the network information system, and to terminate the processes on the computing nodes, independent of the batch queuing system, that are identified via the process tracking module.

25. A system for terminating processes that are executing on a plurality of distributed computing nodes, comprising:

a batch queuing means for receiving jobs from a user and dispatching jobs to the distributed computing nodes;

a process shutdown means for receiving task criteria for terminating processes corresponding to the task criteria on the distributed computing nodes; and an automatic process shutdown means, in communication with the process shutdown means, for receiving task criteria for terminating jobs from a process shutdown interface and retrieving information based on the task criteria from the batch queuing means regarding a processing location of jobs submitted to the batch queuing means, and for terminating the processes on the computing nodes, independent of the batch queuing system, that are identified using the information obtained from the batch queuing means.

26. A system for terminating processes that are executing on a plurality of distributed computing nodes, comprising:

a batch queuing system configured to receive jobs from a user and to dispatch jobs to the distributed computing nodes;

a process shutdown interface, configured to receive a request from a user for terminating all jobs being processed for the user on the distributed computing nodes; and an automatic process shutdown module, in communication with the process shutdown interface, configured to receive task criteria for terminating jobs from the process shutdown interface and to retrieve information about all the user's jobs from the batch queuing system, including a processing location of processes for jobs submitted to the batch queuing system, and configured to terminate all the user's processes on the computing nodes, independent of the batch queuing system, that are identified using the information obtained from the batch queuing system.

* * * * *

UNITED STATES PATENT AND TRADEMARK OFFICE
CERTIFICATE OF CORRECTION

PATENT NO. : 7,219,345 B2  Page 1 of 1
APPLICATION NO. : 10/322221
DATED : May 15, 2007
INVENTOR(S) : John W. Maly et al.

It is certified that error appears in the above-identified patent and that said Letters Patent is hereby corrected as shown below:

In column 8, line 19, in Claim 7, delete "farther" and insert -- further --, therefor.

In column 8, line 45, in Claim 10, delete "farther" and insert -- further --, therefor.

In column 8, line 48, in Claim 11, delete "farther" and insert -- further --, therefor.

In column 9, lines 46-47, in Claim 24, delete "nodes; via a batch queuing system" and insert -- nodes via a batch queuing system; --, therefor.

In column 9, line 50, in Claim 24, delete "processes; distributed by the batch queuing system" and insert -- processes distributed by the batch queuing system; --, therefor.

In column 10, line 27, in Claim 25, delete "the batch" and insert -- a batch --, therefor.

Signed and Sealed this

Nineteenth Day of August, 2008

JON W. DUDAS
*Director of the United States Patent and Trademark Office*